United States Patent [19]

Chamuel

[11] Patent Number: 4,593,385

[45] Date of Patent: Jun. 3, 1986

[54] FIBER OPTIC SENSOR LEAD FIBER NOISE CANCELLATION

[75] Inventor: Jacques R. Chamuel, Framingham, Mass.

[73] Assignee: The Charles Stark Draper Laboratory, Cambridge, Mass.

[21] Appl. No.: 496,124

[22] Filed: May 19, 1983

[51] Int. Cl.⁴ ............................ H04R 1/44; G01B 9/02
[52] U.S. Cl. ...................................... 367/149; 73/657; 350/96.29; 356/349; 367/140
[58] Field of Search ............... 367/149, 140, 151, 174; 73/657, 655, 653, 649; 350/96.24, .96.29, 96.3, 96.18, 69.29; 356/349

[56] References Cited

U.S. PATENT DOCUMENTS

| | | | |
|---|---|---|---|
| 3,580,082 | 5/1971 | Strack | 73/655 |
| 3,611,277 | 10/1971 | Yoder | 367/174 |
| 3,903,496 | 9/1975 | Stimler | 350/96.24 |
| 3,903,497 | 9/1975 | Stimler et al. | 367/149 |
| 3,940,608 | 2/1976 | Kissinger et al. | 350/96.24 |
| 4,115,753 | 9/1978 | Shajenko | 367/149 |
| 4,154,529 | 5/1979 | Dyott | 350/96.18 |
| 4,162,397 | 7/1979 | Bucaro et al. | 367/149 |
| 4,265,122 | 5/1981 | Cook et al. | 367/140 |
| 4,297,887 | 11/1981 | Bucaro | 73/655 |
| 4,313,185 | 1/1982 | Chovan | 367/149 |
| 4,363,114 | 12/1982 | Bucaro et al. | 73/657 |
| 4,451,151 | 5/1984 | Huignard | 367/149 |
| 4,486,657 | 12/1984 | Bush | 367/149 |

OTHER PUBLICATIONS

Monsay and Gilbert, Predicted Performance of a Heterodyne Detector With a Fiber Optic Coil Hydrophone, p. 31, IEEE, 1981.
N. Lagakos, J. A. Bucaro and J. Jarzynski, Temperature-Induced Optical Phase Shifts in Fibers, Applied Optics, vol. 20, No. 13, pp. 2305-2308, 7/1/81.
Gianino and Bendow, Calculations of Stress-Induced Changes in the Transverse Refractive-Index Profile of Optical Fibers, Applied Optics, vol. 20, No. 3, pp. 430-434, 2/81.
Jarzynski, Cole, Bucaro and Davis, Magnetic Field Sensitivity of an Optical Fiber With Magnetostrictive Jacket, Applied Optics, vol. 19, No. 22, pp. 3746-3748, 11/15/80.
Rines, Fiber-Optic Accelerometer With Hydrophone Applications, Applied Optics, vol. 20, No. 19, pp. 3453-3459, 10/1/81.
Bucaro, Optical Fiber Acoustic Sensors, Conference on Physics of Fiber Optics, Univ. of R.I., 6/21/78.

Primary Examiner—David H. Brown
Assistant Examiner—John E. Griffiths
Attorney, Agent, or Firm—Weingarten, Schurgin, Gagnebin & Hayes

[57] ABSTRACT

An optoacoustic hydrophone for detection of acoustic waves in a fluid such as sea water. The hydrophone includes an optical waveguide comprising a fiber optic input lead, a fiber optic sensor, and a fiber optic exit lead, an optical subassembly and a signal processor. A coherent light beam generated by the optical subassembly is transmitted through the input lead and the sensor which is disposed in the fluid. Acoustic waves in the fluid modulate the index of refraction of the fiber optic sensor thereby modulating the transmitted light beam. The modulated light beam is directed through the fiber optic exit lead to a focus on one of two photodetectors. The other photodetector is oriented for receipt of light reflected from a partially reflective mirror disposed between the input fiber optic lead and the fiber optic sensor. The two light beams impinging on respective photodetector are combined with unmodulated light beams of slightly different frequencies to produce an interference pattern at each photodetector. Each photodetectors produces an electrical signal representative of the interference pattern and the respective electrical signals are applied to a phase meter. The phase meter produces an output signal representative of the acoustic wave alone which corresponds to the difference between the two electrical signals provided by respective photodetectors. The disclosed optoacoustic hydrophone effectively cancels common mode lead noise resulting from towage of the optical waveguide through the fluid. Pressure effects in optical fibers created by other physical mechanisms are also sensed by the present apparatus.

5 Claims, 2 Drawing Figures

FIBER OPTIC SENSOR LEAD FIBER NOISE CANCELLATION

FIELD OF THE INVENTION

The present invention relates to hydrophones and more specifically to optoacoustic hydrophones.

BACKGROUND OF THE INVENTION

Acoustic hydrophones are commonly employed in ASW and seismic applications to convert acoustic waves in a fluid medium such as sea water, to signals representative of sound waves in the fluid. A hydrophone typically includes a wet-end sensor which is disposed in the fluid, a dry-end signal processor, and a cable for connection of the sensor to the processor. The signal processor is usually located aboard a ship or a submarine and the wet-end sensor is towed behind the vessel.

One type of acoustic hydrophone utilizes an electromechanical sensor such as a magnetostrictive or piezoelectric transducer as the wet-end sensor. Such sensors are connected to a remote signal processor via an electrical cable. The use of an electrical cable for connection of the sensor to the processor is disfavored due to problems such as cable corrosion, cable breakage, electrical cross-talk, cable bulk and expense.

Optoacoustic hydrophones which employ fiber optic leads and a fiber optic sensor have become increasingly common in the last few years contemporaneous with technological advances in fiber optic technology. The use of fiber optic leads for connection of the wet-end sensor to the dry-end processor avoids the problems associated with the use of electrical cables.

Typical optoacoustic hydrophones employ a fiber optic sensor as the wet-end sensor and utilize fiber optic leads for connection of the sensor to the remote processor. Coherent light at a first frequency is directed through the leads and the sensor. Acoustic waves impinge on the fiber optic coil and modulate the coil optical path lengths thereby modulating the transmitted light beam. The modulated light beam is combined with coherent light of a slightly different frequency to produce a modulated interference pattern which is converted to an electrical signal representative of the impinging acoustic waves.

It has been observed that towage of the fiber optic leads through the fluid produces undesirable modulation of the transmitted light beam resulting from fluid acoustic noise interactions with the fiber optic leads. The lead related modulation results in distortion of the detected signal which is due partially to flow noise.

Monsay and Gilbert in a paper entitled "Predicted Performance of a Heterodyne Detector with a Fiber Optic Coil Hydrophone" describe a fiber optic hydrophone which minimizes distortion of acoustic signals resulting from modulation of the lead fibers due to stray acoustic signals and flow noise. The Monsay hydrophone employs a heterodyne detection system in which two coherent light beams at slightly different frequencies are focussed into two optical fibers which are optically coupled to the wet-end fiber optic sensor. At the sensor, each lead fiber end is coated with a dielectric mirror coating to partially reflect light back down respective leads. Acoustic waves in the fluid modulate the index of refraction of the coil. The transmitted portions of the two coherent light beams are modulated at the sensor. The light beams exit the respective lead fibers and each beam is combined with another light beam of slightly different frequency to produce two interference patterns modulated in accordance with the acoustic wave impinging the sensor. The phase difference between the two interference signals is measured to produce a signal representative of the acoustic wave alone.

Bucaro in U.S. Pat. No. 4,162,397 discloses another fiber optic acoustic sensor for detection of sound waves in a fluid medium. Bucaro shows a fiber optic coil sensor disposed in one path of a double path interferometer, the second path being isolated from the acoustic field. Acoustic waves impinging on the fiber optic coil modulate the coil's optical path length and modulate a first light beam transmitted through the coil. A second beam of light is directed along an isolated and unmodulated path. The two beams are combined to produce an interference pattern which is directed into a photocell. The photocell produces a signal which is filtered to provide an output signal representative of the acoustic wave.

In prior fiber optic hydrophones, trade offs were made between hydrophone linearity and the magnitude of the signal to noise ratio. It has been necessary to employ lead fibers having a low transmission efficiency to avoid multiple reflections of light at the sensor boundaries with consequent distortion of the detected signal. Additionally, it has been necessary to maintain a low light beam intensity to avoid multiple beam reflections and accompanying signal distortion.

SUMMARY OF THE INVENTION

In accordance with the invention there is provided an improved optoacoustic hydrophone incorporating means for cancelling of noise contributions resulting from towage of an optical waveguide through a fluid.

A laser is focussed upon a Bragg cell to generate first and second light beams of coherent radiation at first and second frequencies. The light beam at the first frequency enters a fiber optic lead at an input end, the opposite end being optically coupled to one end of a fiber optic coil sensor. A reflecting mirror is disposed between the fiber optic input lead and the fiber optic sensor. A fiber optic exit lead of length equal to the input lead is optically coupled to or integral with the fiber optic sensor.

The light beam of the first frequency enters the input fiber optic lead and a portion of the light is reflected off the reflecting mirror disposed between the input lead and the sensor. The reflected light is combined with a portion of the light beam at the second frequency to form an interference pattern which is focussed on a first photodetector. Another portion of the light beam entering the first input lead is transmitted through the fiber optic sensor and modulated at the sensor by acoustic waves within the fluid medium. The modulated light beam is transmitted through the exit fiber optic lead and combined with unmodulated light at the second frequency to form an interference pattern which is focussed on a second photodetector. A phase meter produces an output signal which is representative of the difference between the interference patterns produced at the two photodetectors. The disclosed hydrophone effectively cancells common mode flow noise in the input and exit leads and produces an output signal which is representative of the acoustic wave alone.

Additionally, the invention is operative at an optical efficiency of 50% with approximately one half of the light intensity entering the input fiber being transmitted through the coil sensor and the exit fiber. This efficiency is achieved with only one partially reflecting mirror disposed in the optical fiber path.

DESCRIPTION OF THE DRAWINGS

The invention will be more fully understood from the following detailed description taken in conjunction with the accompanying drawings in which.

DETAILED DESCRIPTION OF THE INVENTION

Figure 1:
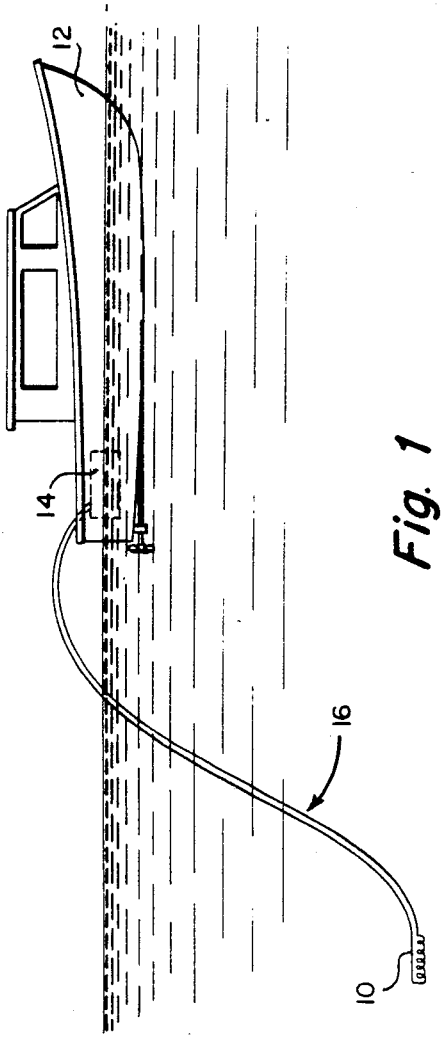
FIG. 1 is a pictorial view illustrating the deployment of an optoacoustic hydrophone in accordance with the present invention.

Referring to FIG. 1, a fiber optic sensor 10 is shown towed behind a vessel 12. Aboard the vessel 12 is a dry end processor 14 which interfaces to the fiber optic sensor 10 via fiber optic leads 16. A coherent light beam is directed from the dry end processor through the fiber optic leads 16 and the sensor 10. Acoustic waves within a fluid such as seawater impinge on the sensor 10 and modulate the light beam. The modulated light beam corresponding to the acoustic waves are transmitted through the fiber optic leads 16 and converted by the dry end processor 14 to electrical signals representative of the acoustic waves. The light beam is also modulated as it is transmitted through the leads as a consequence of lead towage through the fluid to produce an undesirable lead noise component. This noise component, known as flow noise, is cancelled as common mode noise by the processor 14 to produce a signal representative of the acoustic waves alone.

Figure 2:
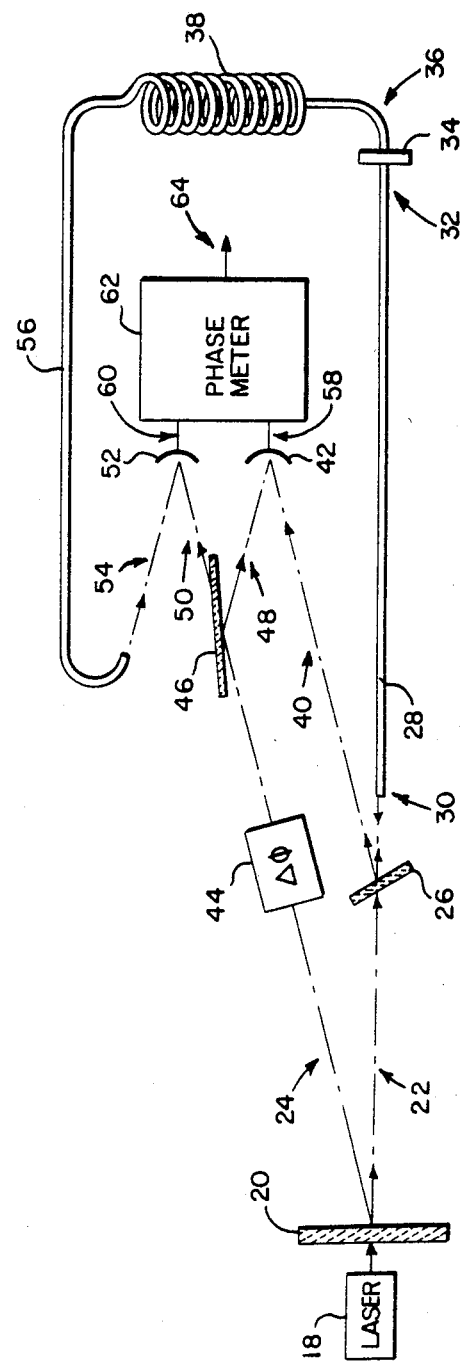
FIG. 2 is a generalized schematic of an optoacoustic hydrophone in accordance with the present invention.

An apparatus operative as an optoacoustic hydrophone in accordance with the present invention is illustrated in FIG. 2. A laser 18 generates a coherent beam of light which is focussed on a Bragg cell 20 to produce a first light beam 22 at the lasing frequency and a second beam 24 of coherent light at a second frequency varying slightly from the lasing frequency. The first light beam 22 impinges on the non-reflective surface of a first partially reflecting mirror 26 and the transmitted portion of the beam 22 enters an input fiber optic lead 28 having a light entry end 30 and a sensor end 32. The light beam 22 travels through the input lead 28 and impinges on a second partially reflecting mirror 34 disposed in a light transmitting relationship between the sensor end 32 of the input lead 28 and the input end 36 of a fiber optic sensor 38. The fiber optic sensor 38 may be a fiber optic coil sensor as illustrated, or a fiber optic sensor having any other shape or form. Approximately one half of the light impinging on the second partially reflecting mirror 34, which is typically a 50% reflecting mirror, is reflected off the mirror 34 back along the input fiber 28. The reflected beam 40 exits the fiber optic input lead 28 at the entry end 30, impinges upon the reflective side of the first partially reflecting mirror 26, and is focussed upon a first photodetector 42. The photodetector 42 may be a photomultiplier tube, a phototransistor, a photodiode, a photocell or any other suitable photosensitive device.

The second light beam 24 is directed to a phase shifter 44. The output from the phase shifter 44 impinges on a beam splitter 46 which is a partially transmissive mirror or any optical device performing an equivalent function. The splitter 46 produces a first reference beam 48 and a second reference beam 50 and is oriented to direct the first reference beam 48 to a focus at the first photodetector and to direct the second reference beam 50 to a focal point at a second photodetector 52. The first reference beam 48 combines with the reflected light beam 40 to produce a first interference pattern at the first photodetector 42. The first interference pattern is modulated in accordance with flow noise resulting from towage of the input fiber optic lead 28 through the fluid medium.

A portion of the light beam 22 impinging on the second partially reflective mirror 34 is transmitted through the mirror 34 and the fiber optic sensor 38. Acoustic waves in the fluid impinge on the fiber optic sensor 38 and modulate the optical path length of the sensor 38. The light beam passes through the sensor 38 and is phase modulated in accordance with the impinging acoustic wave, producing a phase modulated exit light beam 54. The exit light beam 54 is transmitted through an exit fiber optic lead 56 to a focus at the second photodetector 52. The modulated light beam 54 is combined with the second reference beam 50 at the second photodetector 52 to produce an interference pattern which includes two modulation components; one being the phase modulation component produced by modulation of the light beam within the fiber optic sensor 38 and the other being the modulation component corresponding to modulation of the input light beam 22 and the exit light beam 54 within the input fiber optic lead 28 and the exit fiber optic lead 56 respectively. The second modulation component is a flow noise component resulting from fluid flow past the towed fiber optic leads 28 and 56. The fibers 28 and 56 are of substantially equal length and are thus exposed to the same environmental effects.

The first photodetector 42 and the second photodetector 52 provide a first electrical signal 58 and a second electrical signal 60 corresponding to the interference patterns detected at the respective photodetectors. The first and second electrical signals are applied to a phase meter 62 which provides an electrical output signal 64 representative of the difference between the first electrical signal 58 and the second electrical signal 60. Both the first and second electrical signals include a modulation component corresponding to flow noise in the input and exit leads while only the second electrical signal 60 includes the modulation component corresponding to acoustic wave modulation of the fiber optic sensor 38. The phase meter 62 provides an output corresponding to the difference between the first and second electrical signals 58 and 60 and operates to cancel the common mode flow noise components included in the first electrical signal 58 and the second electrical signal 60. The phase meter therefore provides an electrical output signal 64 solely representative of the acoustic wave modulation component in the second electrical signal 60. The phase meter 62 provides an indication of the magnitude and frequency of the pressure effects that sensor 38 is exposed to.

The optical hydrophone provided in accordance with this disclosure is operative at an optical efficiency of 50%. Approximately one half of the light beam intensity directed into the fiber optic input lead 28 is transmitted through the sensor 38 and the exit lead 56. This efficiency is achieved with only one mirror 34 in the fiber optic path.

It is further contemplated that the optical fiber sensor of the present invention may be disposed, mounted or otherwise embedded in a non-fluid material such as a metal, graphite, plastic or any other non-fluid material to provide an output signal representative of stress waves, pressure gradients or magnetostrictive effects within the material or indicative of changes in temperature coefficients within the material or any other effect which produces a change in the optical path length of the sensor disposed in the material.

While only specific embodiments of the optical hydrophone in accordance with the invention have been illustrated, modifications of, other uses for, and departures from the inventive concepts herein contained shall be apparent given the benefit of the foregoing disclosure. Consequently this invention is to be construed as embracing each and every novel feature or combination of features present in or possessed by the optical hydrophone herein disclosed and shall be limited only by the scope and spirit of the appended claims.

What is claimed is:

1. An electro-optical system for the detection of a physical property manifest as a pressure effect by means of the interaction of the pressure effect on an optical waveguide, said system comprising:

an optical sensor responsive to pressure effects to vary the optical transmission therethrough;

first and second optical waveguides having said optical sensor in light communicating relationship therebetween to define a first optical path from an end of said first waveguide through said sensor and then through said second waveguide to an end thereof;

a first partially reflecting means located in said first optical path between said first waveguide and said sensor to define a second optical path from the end of said first waveguide through said first waveguide and then by reflection from said first partially reflecting element back through said first waveguide to the end thereof;

said first and second waveguides adapted to experience the same environmental effects;

means for applying light of a first frequency to the end of said first waveguide to produce light along said first and second optical paths respectively appearing at said ends of said second and first waveguides;

said means for applying light also producing;

means for producing a first interference pattern resulting from light on said first path appearing at said end of said second waveguide combined with the light of said second frequency and for producing a second inteference pattern resulting from light on said second path appearing at said end of said first waveguide combined with the light of said second frequency;

first and second photodetector means for sensing the light in said first and second interference patterns respectively to produce first and second output signals; and means responsive to said first and second output signals for providing an output indication of the pressure effects on said optical senses.

2. The system of claim 1 wherein said means for providing an output indication includes a phase meter.

3. The system of claim 1 wherein said sensor is an optical waveguide responsive in optical length to said pressure effect.

4. The system of claim 1 wherein said partially reflecting means provides fifty percent reflectance.

5. The system of claim 1 wherein said means for producing said first and second interference patterns includes a beam splitter for providing first and second beams of light at said second frequency directed respectively toward said first and second photodetector means.

* * * * *

UNITED STATES PATENT AND TRADEMARK OFFICE
CERTIFICATE OF CORRECTION

PATENT NO. : 4,593,385
DATED : June 3, 1986
INVENTOR(S) : Jacques R. Chamuel

It is certified that error appears in the above-identified patent and that said Letters Patent is hereby corrected as shown below:

In the Abstract, lines 21-22, "photodetectors" should read --photodetector--

Column 2, line 64, "cancells" should read --cancels--

Column 6, line 10, "producing;" should read --producing light of a second frequency;-- line 25, "senses." should read --sensor.--

Signed and Sealed this

Twenty-third Day of December, 1986

Attest:

DONALD J. QUIGG

Attesting Officer   Commissioner of Patents and Trademarks